2,871,125

METHOD OF MAKING BAKERY PRODUCTS

Noel H. Kuhrt and Milton I. Van Graafeiland, Rochester, N. Y., assignors to Eastman Kodak Company, Rochester, N. Y., a corporation of New Jersey No Drawing. Application November 3, 1955
Serial No. 544,805

6 Claims. (Cl. 99—91)

This invention relates to improvements in the preparation of bakery products, and more particularly to the preparation of bakery products with improved monoglyceride compositions.

One of the desirable properties of bakery products is an extended period of softness, this being a particularly desirable property of breads. Desirable properties of other bakery products such as cakes, for example, are improved volume, texture and grain.

It is an object of this invention to prepare improved bakery products by a novel process.

It is another object of this invention to provide bread having an extended period of softness by a new and improved method.

It is a further object of this invention to provide cake having improved texture, grain and volume by novel means.

It is an additional object of this invention to employ an improved monoglyceride composition in the preparation of bakery products.

These and other objects are accomplished by incorporating into a baking mix prior to baking a monoglyceride composition in an amount comprising 0.1–3.0% by weight of the baking mix and being comprised of 50–95% by weight higher triglyceride having fat-forming fatty acid radicals and 5–50% by weight purified and concentrated monopalmitin, the monoglyceride composition being characterized as a fatty material having substantially uniformly dispersed therein more than about 25% by weight of the monopalmitin in needle-like microcrystalline form.

The term "bakery products" includes such well-known baked products as bread, cakes, cookies and the like. The term "bread" includes not only loaf bread, but also rolls, buns, biscuits and similar baked products. As used herein, the term "baking mix" refers to the mixture of ingredients commonly employed in the preparation of bakery products, and may include such materials as flour, shortening, sugar, salt, powdered milk, water, yeast, yeast food, baking powder, flavoring, coloring, eggs, syrup and the like. The term "monopalmitin" refers to a palmitic acid monoester of glycerine and is equivalent to the term "glycerol monopalmitate."

The present monoglyceride composition preferably comprises 0.1–3.0% by weight of the baking mix and can be part of, or the entire shortening material used in the bakery products prepared in accordance with the present invention. For example, monoglyceride compositions containing less than about 10% by weight of monopalmitin can be suitably employed as the entire shortening material used in bread making mixes. In the case of monoglyceride compositions containing more than about 10% by weight monopalmitin, additional shortening materials such as lard are usually added to bread baking mixes so that the monopalmitin comprises less than about 10% by weight of the total shortening material employed.

The instant monoglyceride composition is a fatty material comprised of 50–95% higher triglyceride and 5–50% monopalmitin by weight. A preferred monoglyceride composition is comprised of 5–20% monopalmitin and 80–95% solid fat such as lard by weight. Another preferred monoglyceride composition is comprised of 20–50% monopalmitin and 50–80% vegetable oil such as cottonseed oil by weight.

The higher triglycerides comprising the monoglyceride composition employed in the present process can be any of the animal and vegetable fats and oils commonly employed in bakery products as shortenings, and include such fatty materials as lard, butter, cottonseed oil, soybean oil, coconut oil, palm oil, corn oil, olive oil, and the like. Likewise, higher fatty triglycerides modified by hydrogenation or molecular rearrangement can be utilized in the present process.

The purified and concentrated monopalmitin portion of the present monoglyceride composition is comprised of more than about 85% monopalmitin, and more usually more than about 90% monopalmitin. Such purified and concentrated monoglycerides can be made, for example, by reacting palmitic acid or tripalmitin and glycerine in the presence of an alcoholysis catalyst, and thereafter separating a purified and concentrated monopalmitin portion by thin film, high vacuum distillation, or by any other suitable separating means. The preparation of purified and concentrated monoglycerides by thin film, high vacuum distillation is described in United States Patents 2,634,234, 2,634,278 and 2,634,279. Purified and concentrated monoglycerides are to be distinguished from mono- and di-glyceride mixtures which usually contain 40–50% monoglyceride, 40–50% diglyceride and 5–20% triglyceride by weight.

The monoglyceride composition used in the immediate baking process is particularly characterized as being comprised of a higher fatty triglyceride having uniformly dispersed therein monopalmitin in needle-like microcrystalline form. The present needle-like microcrystals are to be distinguished from other forms of microcrystals often times found in fatty compositions. The instant needle-like microcrystals appear to be about .05–.2 micron in diameter and about 1–20 microns in length. Such crystals can be readily observed, for example, with polarized light at a magnification of about 500 times. Monoglyceride compositions containing varying amounts of the monopalmitin portion therein in the desired needle-like microcrystalline form can be employed. However, monoglyceride compositions containing more than about 25% by weight of the monopalmitin portion therein in needle-like microcrystalline form are suitable and are more generally used, and monoglyceride compositions containing more than about 50% by weight of the monopalmitin portion therein in needle-like microcrystalline form are preferably employed.

The instant monoglyceride composition is prepared by reducing its component parts, namely, higher fatty triglyceride and monopalmitin, to a liquefied composition, rapidly cooling the liquefied composition with uniform mechanical agitation, and promoting uniform crystallization of the resulting cooled composition with further uniform mechanical agitation. Such a sequence of steps promotes the formation of fine uniform crystals and is commonly called "Votating." Apparatus for effecting the "Votating" process is described in United States Patents 2,063,065 and 2,063,066. The "Votating" process is also described by A. E. Bailey in Industrial Oil and Fat Products, 2nd edition, 1951, Interscience Publishers, Inc., New York, pages 920–924.

The "Votated" composition is thereafter tempered to produce the above described needle-like microcrystals of monopalmitin dispersed therein. Such tempering can comprise merely storing the "Votated" composition at temperatures slightly above room temperature. For example, a "Votated" mixture comprised of 30% monopalmitin and 70% cottonseed oil by weight which had been stored at about 95° F. showed no needle-like microcrystals of monopalmitin after two days, a few (less than about 10% by weight of the monopalmitin) needle-like microcrystals of monopalmitin after 21 days and many (about 25–50% by weight of the monopalmitin) needle-like microcrystals of monopalmitin after 42 days as observed under polarized light through a microscope having a magnification of 440 times. The time for the formation of needle-like microcrystals can be substantially reduced by tempering at higher temperatures. For example, more than about 75% by weight of the monopalmitin in a "Votated" mixture comprised of 30% monopalmitin and 70% cottonseed oil by weight can be converted into the present needle-like microcrystals by tempering at a temperature of 115° F. for about 10 days. Thus, the tempering can be effected over a wide range of time and temperature conditions.

While the "Votating" and tempering process described herein is particularly effective for preparing the present monoglyceride compositions, any other process suitable for producing the monopalmitin dispersed in the monoglyceride composition in the desired needle-like microcrystalline form can also be utilized.

Bakery products prepared with the present monoglyceride composition have improved properties over bakery products prepared with ordinary shortenings. The bakery products prepared in accordance with the present process have improved softness, texture, grain and volume. Of particular significance is the extended shelf-life which is characteristic of bread baked with the present monoglyceride composition. Also cakes having improved texture, grain and volume can be prepared with the instant monoglyceride composition.

As defined by the American Society of Bakery Engineers in Bulletin No. 145 dated May 1954, the term "texture" refers to "the sensation obtained when the thumb or fingers are lightly passed across the crumb surface"; and the term "grain" refers to "the size, shape and arrangement of the cells comprising the cut surface of the crumb." A Baker Compressimeter, such as is described in Cereal Laboratory Methods, 5th edition, 1947, compiled and published by the American Association of Cereal Chemists, pages 162–165, was used to determine the softness of the bread in the following examples.

The improved properties shown by bakery products prepared in accordance with this invention are illustrated by the following examples of specific embodiments of the invention.

EXAMPLE 1

Bread was prepared from a formula having the following ingredients:

*Sponge*

| | Parts by weight |
|---|---|
| Flour | 65.0 |
| Water | 40.5 |
| Yeast | 1.75 |
| Yeast food | 0.50 |

*Dough*

| | |
|---|---|
| Flour | 35.0 |
| Water | 27.0 |
| Sugar | 6.00 |
| Salt | 2.27 |
| Powdered milk | 4.00 |
| Lard | 1.71 |
| Monoglyceride composition | .575 |

The sponge was mixed for 4.5 minutes and allowed to ferment 4.5 hours at 87° F. and at a relative humidity of 80%. To the resulting fermented sponge was added the dough ingredients. The sponge and the dough ingredients were admixed for 9.5 minutes, given a 30 minute "floor time," made up into loaves, and allowed to rise for 65 minutes at 89° F. and at a relative humidity of 95%. The raised dough batch was then baked at 430° F. for 27 minutes. The resulting bread loaves, each weighing about 450 gms., were allowed to cool at room temperature for one hour and thereafter wrapped and sealed in wax paper, stored at 72° F. The flour employed in both the sponge and the dough was short-patent spring wheat, white, bread flour. The monoglyceride composition in the dough was comprised of a "Votated" and tempered composition comprised of 60% by weight refined and bleached cottonseed oil and 40% by weight distilled high purity (90%) monopalmitin prepared from glycerine and high purity, edible, grade palmitic acid. More specifically, the monoglyceride composition was prepared by combining the monopalmitin and the cottonseed oil and reducing the mixture to a liquid state at a temperature of 160° F. The resulting liquefied composition was thereafter admixed with nitrogen and conveyed into the first unit of a "Votator", commonly called an "A unit." The function of an "A unit" is mainly to rapidly cool the liquefied composition and to establish nuclei for the formation of a fine crystal structure. The "A unit" used was comprised essentially of a cylindrical chamber having an inlet opening and an outlet opening, a refrigerated inner wall and rotating scraper blades in scraping contact with the refrigerated inner wall. The liquid composition of cottonseed oil and monopalmitin fed into the inlet opening of the "A unit" was supercooled with continuous agitation, material on the refrigerated inner wall of the unit being continually scraped off by the rapidly rotating scraper blades. The composition was in the "A unit" for an average time of about 15 seconds. The composition leaving the outlet opening of the "A unit" was a supercooled, liquefied material having a temperature of about 90° F. and having nuclei established for the formation of a very fine crystalline structure. From the "A unit," the composition was continuously fed into a second unit of the "Votator," commonly called a "B unit." The "B unit" functions mainly to maintain the cooled composition in a state of uniform agitation while crystallization takes place. The "B unit" used was comprised essentially of a cylindrical chamber having an inlet opening and an outlet opening, a rotating shaft set with projecting fingers, and similar stationary fingers projecting from the inner chamber wall so as to intermesh with projecting fingers on the rotating shaft. The cottonseed oil and monopalmitin mixture was in the "B unit" about five times longer than it was in the "A unit." The resulting "Votated" composition conveyed from the "B unit" was a creamy, plastic composition. The "Votated" composition was thereafter tempered in gallon size metal containers at a temperature of about 130° F. for 10 days to produce the present monoglyceride composition. The present monoglyceride composition was characterized as having more than about 75% by weight of the monopalmitin substantially uniformly dispersed therein in needle-like microcrystalline form as seen through a microscope under polarized light at a magnification of 440 times. The baked bread had excellent properties such as close grain and silky texture. Also, the baked bread retained the desirable softness characteristic of fresh bread 2 to 2½ times longer than did bread prepared in the same manner and with the same ingredients except for the monoglyceride composition which contained substantially no monopalmitin dispersed therein in the preferred needle-like microcrystalline form.

EXAMPLE 2

Bread was prepared from a formula having the following ingredients:

*Sponge*

| | Parts by weight |
|---|---|
| Flour | 65.0 |
| Water | 40.5 |
| Yeast | 1.75 |
| Yeast food | 0.50 |

*Dough*

| | Parts by weight |
|---|---|
| Flour | 35.0 |
| Water | 27.0 |
| Sugar | 6.00 |
| Salt | 2.27 |
| Powdered milk | 4.00 |
| Monoglyceride composition | 2.29 |

The ingredients of the bread formula were mixed, treated and baked as described in Example 1. The monoglyceride composition was the total shortening used in the bread and was comprised of 90% by weight prime, steam-rendered lard and 10% by weight distilled, high purity (90%) monopalmitin prepared from glycerine and high purity, edible grade palmitic acid. The monoglyceride composition was "Votated" as described in Example 1 and tempered in gallon size metal containers for 42 days at a temperature of about 85° F. The monoglyceride composition was characterized as having about 25–50% by weight of the monopalmitin substantially uniformly dispersed therein in needle-like microcrystalline form as seen through a microscope under polarized light at a magnification of 440 times. The bread was characterized as being close grained and of silky texture. At intervals the bread was tested for softness and exhibited an extended period of softness or "shelf-life" which was 2 to 2½ times longer than bread prepared in the same manner and with the same ingredients except for the monoglyceride composition which contained substantially no monoglyceride dispersed therein in the preferred needle-like microcrystalline form.

EXAMPLE 3

A white cake was baked from a formula having the following ingredients:

| | Parts by weight |
|---|---|
| Whole milk | 149 |
| Sugar | 105 |
| Cake flour | 100 |
| Lard | 2.21 |
| Monoglyceride composition | 0.58 |
| Baking powder | 13.6 |
| Powdered egg white | 9.60 |
| Salt | 6.6 |

The monoglyceride composition employed in the cake formula was comprised of 60% by weight refined and bleached cottonseed oil and 40% by weight distilled, high purity (90%) monopalmitin prepared from glycerine and high purity, edible grade palmitic acid. The monoglyceride composition was prepared by the "Votating" and tempering processes described in Example 1, and as viewed under polarized light through a microscope having a magnification of 440 times, the monoglyceride composition had substantially uniformly dispersed therein more than about 75% by weight of the monopalmitin in the preferred needle-like microcrystalline form. In preparing the cake ingredients, the sugar, lard and monoglyceride composition were creamed together at a low mixing speed. To the resulting blended mixture was blended the cake flour, baking powder, salt and powdered egg white at a low mixing speed. Thereafter, ½ of the milk was added and mixed at a medium speed for two minutes, the rest of the milk being mixed into the mixture in two equal portions at a medium mixing speed for one minute. The resulting cake batter was baked in 8 inch layer cake tins, 380 grams of batter in each cake tin, for 21 minutes at 375° F. The resulting cake had excellent volume, close grain and smooth texture.

As shown in the above examples, bakery products prepared in accordance with the present process have improved properties. More particularly, bakery products prepared with the present monoglyceride compositions having monopalmitin in needle-like microcrystalline form substantially uniformly dispersed therein show improvements in such properties as softness, volume, texture and grain.

Although the invention has been described in considerable detail with reference to certain preferred embodiments thereof, it will be understood that variations and modifications can be effected within the spirit and scope of the invention as described hereinabove and as defined in the appended claims.

We claim:

1. The method of preparing bakery products which comprises incorporating into a baking mix prior to baking a monoglyceride composition in an amount comprising 0.1–3.0% by weight of said baking mix and being comprised of 50–95% by weight higher triglyceride having fat-forming fatty acid radicals and 5–50% by weight purified and concentrated monoester consisting essentially of monopalmitin, said monoglyceride composition having more than about 25% by weight of said monopalmitin substantially uniformly dispersed therein in needle-like microcrystals about .05–.2 micron in diameter and about 1–20 microns in length.

2. The method of preparing bakery products which comprises incorporating into a baking mix prior to baking a monoglyceride composition in an amount comprising 0.1–3.0% by weight of said baking mix and being comprised of 80–95% by weight animal fat and 5–20% by weight purified and concentrated monoester consisting essentially of monopalmitin, said monoglyceride composition having more than about 50% by weight of said monopalmitin substantially uniformly dispersed therein in needle-like microcrystals about .05–.2 micron in diameter and about 1–20 microns in length.

3. The method of preparing bakery products which comprises incorporating into a baking mix prior to baking a monoglyceride composition in an amount comprising 0.1–3.0% by weight of said baking mix and being comprised of 50–80% by weight vegetable oil and 20–50% by weight purified and concentrated monoester consisting essentially of monopalmitin, said monoglyceride composition having more than about 50% by weight of said monopalmitin substantially uniformly dispersed therein in needle-like microcrystals about .05–.2 micron in diameter and about 1–20 microns in length.

4. In the baking of bread, the method which comprises incorporating into a bread dough batch prior to baking a monoglyceride composition in an amount comprising 0.1–3.0% by weight of said baking mix and being comprised of 80–95% by weight lard and 5–20% by weight purified and concentrated monoester consisting essentially of monopalmitin, said monoglyceride composition having more than about 50% of said monopalmitin substantially uniformly dispersed therein in needle-like microcrystals about .05–.2 micron in diameter and about 1–20 microns in length.

5. In the baking of bread, the method which comprises incorporating into a bread dough batch prior to baking a monoglyceride composition in an amount comprising 0.1–3.0% by weight of said baking mix and being comprised of 50–80% by weight cottonseed oil and 20–50% by weight purified and concentrated monoester consisting essentially of monopalmitin, said monoglyceride composition having more than about 50% by weight of said monopalmitin substantially uniformly dispersed therein in needle-like microcrystals about .05–.2 micron in diameter and about 1–20 microns in length.

6. In the baking of cake, the method which comprises incorporating into a cake batter prior to baking a monoglyceride composition comprising 0.1–3.0% by weight of said baking mix and being comprised of 50–95% by weight higher triglyceride having fat-forming fatty acid radicals and 5–50% by weight purified and concentrated monoester consisting essentially of monopalmitin, said monoglyceride composition having more than about 50% of said monopalmitin substantially uniformly dispersed therein in needle-like microcrystals about .05–.2 micron in diameter and about 1–20 microns in length.

References Cited in the file of this patent

UNITED STATES PATENTS

| | | |
|---|---|---|
| 2,132,398 | Coith et al. | Oct. 11, 1938 |
| 2,132,416 | Harris | Oct. 11, 1938 |
| 2,132,701 | Richardson et al. | Oct. 11, 1938 |
| 2,402,690 | Stanley | June 25, 1946 |
| 2,431,497 | North et al. | Nov. 25, 1947 |
| 2,611,704 | Jaeger | Sept. 23, 1952 |

OTHER REFERENCES

Hellman et al.: "Jour. of The American Oil Chemists Society," vol. 32, No. 2, February 1955, pp. 110–114.

Wihlfahrt: "A Treatise on Baking," 1934, publ. by Standard Brands, Inc. (N. Y.), page 91.

Wihlfarht: "A Treatise on Baking," 1934, publ. by Standard Brands, Inc. (N. Y.), pp. 319, 322 and 370.

Kuhrt et al.: "Jour. of the American Oil Chemists Society," vol. 27, No. 9, September 1950, pp. 344 to 346.

Bailey: "Industrial Oil and Fat Products," 2nd ed., 1951, publ. by Interscience Publ., Inc. (N. Y.), pp. 255 to 257.